3 Sheets—Sheet 3.
B. WALLIS.
APPARATUS FOR THE MANUFACTURE OF GAS FROM PETROLEUM,
&c.
No. 179,826.   Patented July 11, 1876.
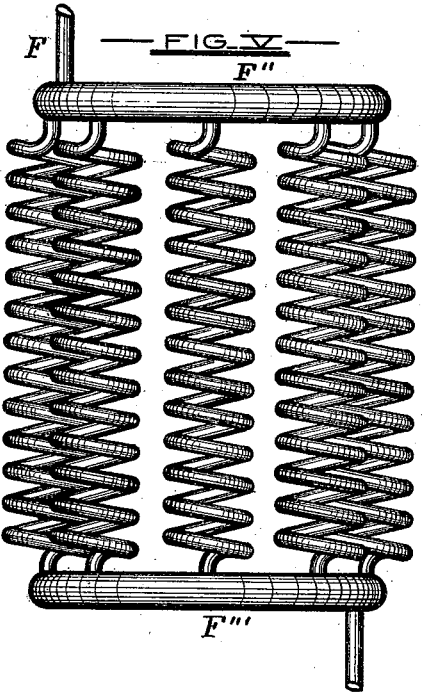
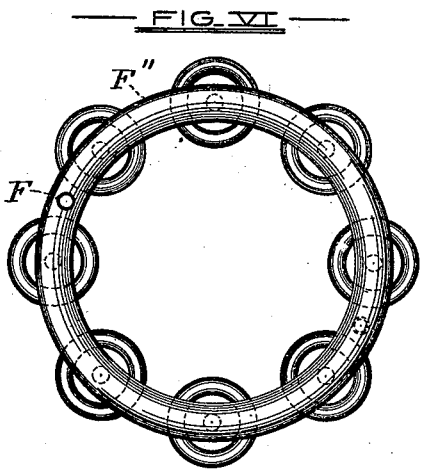

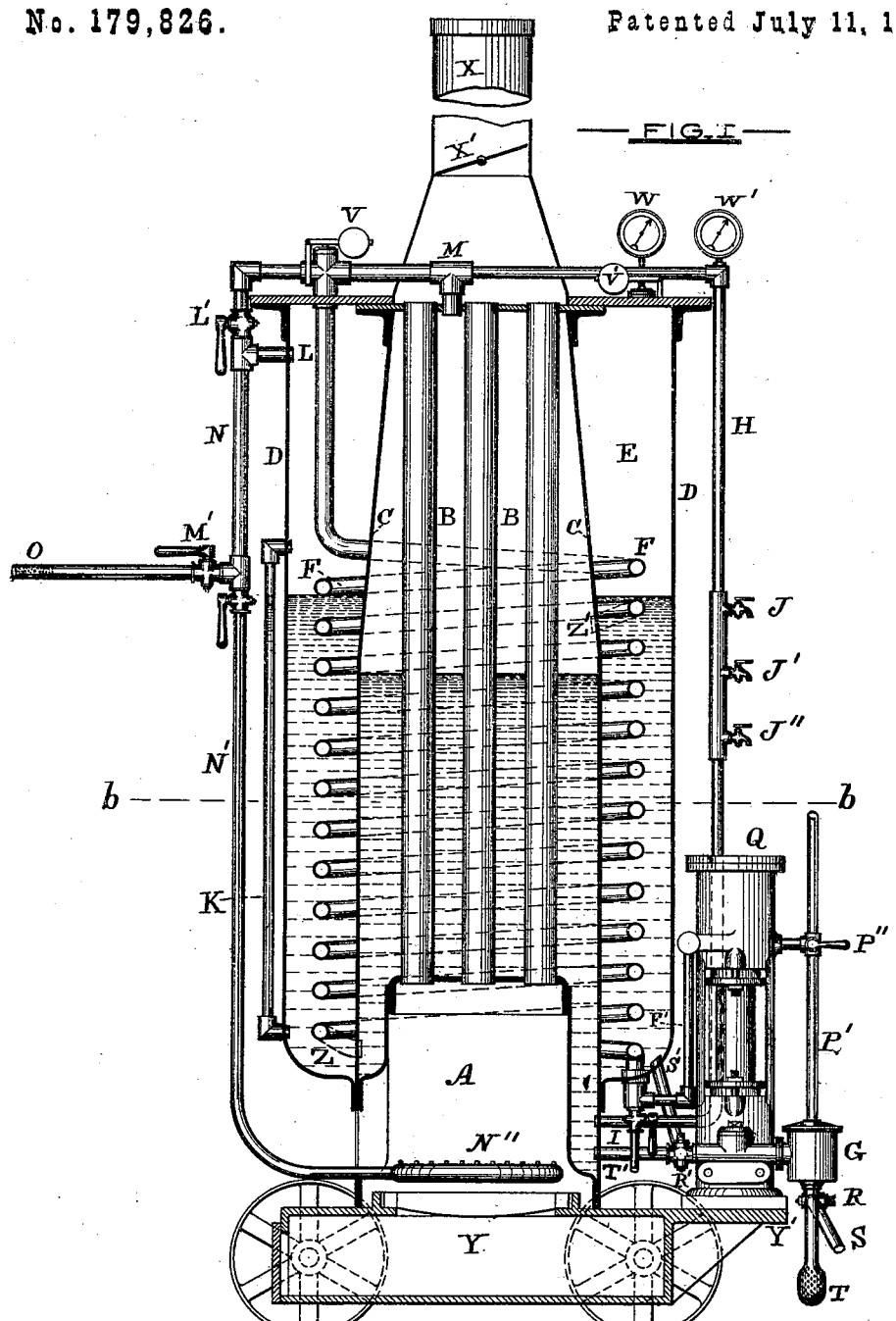
B. WALLIS.
APPARATUS FOR THE MANUFACTURE OF GAS FROM PETROLEUM, &c.
No. 179,826. Patented July 11, 1876.
3 Sheets—Sheet 1.

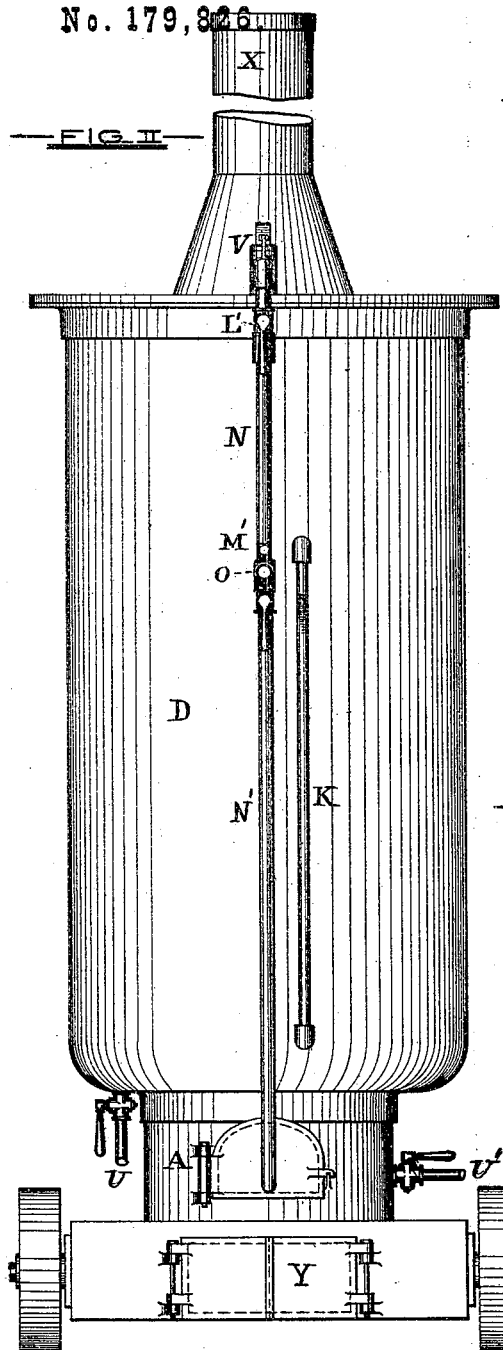
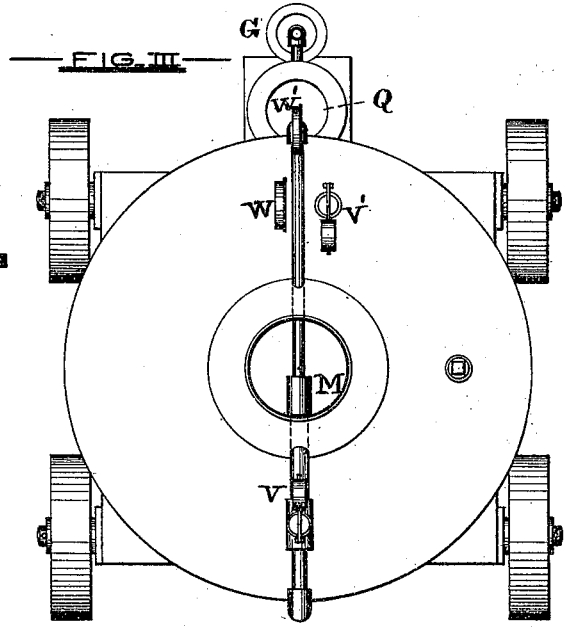
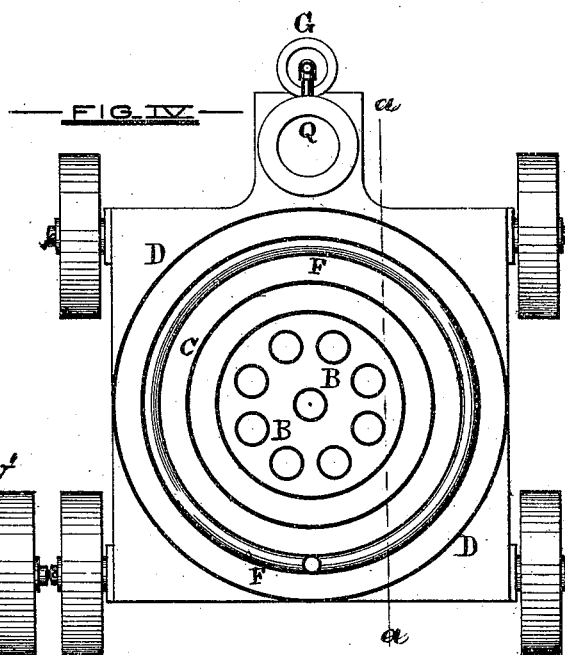

UNITED STATES PATENT OFFICE.

BENJAMIN WALLIS, OF BALTIMORE, MARYLAND.

IMPROVEMENT IN APPARATUS FOR THE MANUFACTURE OF GAS FROM PETROLEUM, &c.

Specification forming part of Letters Patent No. 179,826, dated July 11, 1876; application filed October 25, 1875.

*To all whom it may concern:*

Be it known that I, BENJAMIN WALLIS, of the city and county of Baltimore and State of Maryland, have invented certain new and useful Improvements in Apparatus for the Manufacture of Gas from Petroleum and other hydrocarbons, and for distilling, purifying, and boiling purposes; and I do hereby declare the following is a full, clear, and exact description of the construction and operation of the same, reference being had to the accompanying drawing, forming part of this specification, in which—

Figure 1 represents a sectional view of said apparatus, taken through line *a a* in Fig. 4, showing the interior of the steam and gas generators. Fig. 2 represents an elevation of the apparatus, showing the exterior of the combined steam-generator and gas-generator and their connections. Fig. 3 represents a plan view of the apparatus, showing the exterior of the generators and their connections. Fig. 4 represents a sectional view of the apparatus, taken through line *b b* in Fig. 1, showing its internal form. Fig. 5 represents a view of a modification of the spiral coil F, which consists of a series of spirally-coiled pipes connected to an upper and a lower coil; and Fig. 6 is a plan view of Fig. 5.

Similar letters of reference in the several figures indicate corresponding parts.

This invention relates to improvements in the manufacture of gas from petroleum and other hydrocarbons, and is designed especially for producing gas for heating and illuminating, as also for distilling, purifying, and boiling purposes, by means of superheated or common steam or water heat, in the manner hereinafter described.

The productive power (heat, light, &c.) of petroleum is too commonly known to demand detailing here, and its high percentage of carbon has long commanded the attention of scientists as to the best method of a practical and beneficial utilization of the same. It has been estimated that one gallon of petroleum contains as much heat as twelve hundred to fifteen hundred pounds of coal. Assuming it to be, say, one-half of this—viz., one gallon to six hundred or seven hundred and fifty pounds of coal—it would still show an unprecedented economy.

The advantages gained by this invention are these: That the apparatus is simple, durable, cheap, portable, and complete in itself, making it in every way adaptable for purposes where heat, light, distilling, purifying, and boiling are required, and for such purposes as oil, coal, wood, gas, &c., are now applied.

To enable others skilled in the art to make and use the invention, I will now proceed to describe its construction and operation.

The steam-generator is made of boiler-iron or other suitable material, and by preference is of the ordinary vertical type, with fire-box at the base, and flues springing from the top of the fire-box to the crown of the steam-generator, the water and steam-spaces encircling said fire-box and flues. I prefer making the steam-space conical in form, so as to allow more space in the gas-chamber, as shown in Fig. 1.

A is the fire-box, in which I purpose burning coal or wood until sufficient gas is generated in the gas-chamber E to supply the fuel to the fire-box, and thereafter to use gas conducted through the pipe N' to the burner N'' in lieu of other fuel to continue the generation of steam. B B are the flues for collecting and disseminating heat for the generation of steam. C is the cylinder inclosing the whole of the internal form of the steam-generator. The generator for producing gas from petroleum or other hydrocarbons, as also for distilling, purifying, or boiling, is composed of an iron (or other suitable material) cylinder, D, encircling the cylinder C, the annular space between the cylinders C and D forming the chamber E, wherein the hydrocarbon for the manufacture of gas, liquids for distillation, purifying, or boiling are placed. F is a coil or scroll, of copper (or other suitable material) pipe, placed in the chamber E, for the purpose of transmitting steam (superheated or common) or water heat from the steam-generator through hydrocarbon or other liquids, thereby securing an additional heating-surface to that formed by cylinder C of steam-generator. A circulation is maintained in the coil F by connecting it with the steam-pipe F' for supplying steam to the pump Q; thence through the pipe P', or direct, to the condenser G, and exposing it to the cooling influence of liquids passing through the same. Thus a condensation of the steam is gained, and a circulation through the coil F maintained. The condensed steam flowing with said cooling liquids is pumped into the steam-generator or elsewhere through the pipe T'. P'' is a two-way cock, to admit of steam from coil F, either passing into condenser G or to the atmosphere. I is a cock, for draining coil F of any water that may collect in it by condensation when the apparatus is not in use. J J' J'' are test-cocks attached to pipe H, for indicating the quantity of water in the steam-generator. K is a gage-glass attached to, and indicating the quantity of oil in, the gas-generator. L is the pipe for drawing off the gas from the chamber E. M is the pipe connecting with the crown of the steam-generator, and leading to the coil F, pipe H, safety-valve V, and cock L'. L' and M' are cocks for controlling the amount of vapor from each generator entering or flowing through pipe N, leading to foraminous pipe O, where the products of said generators or generator are consumed. Q is an ordinary steam-pump, with two two-way cocks, R and R', fitted to both the suction and discharge pipes, for the purpose of supplying alternately water and oil to their respective generators. S is the oil-suction pipe; S', the oil-discharge or feed pipe to the gas-generator. T is the water-suction pipe, and T' the water-discharge or feed pipe to the steam-generator. U is the cock to run off the residuum from the gas-generator; U', blow-off pipe from the steam-generator; V V', safety-valves, one to each generator; W W', gages to denote the pressure of the steam or gas in their respective generators; X, the chimney for carrying off the smoke, &c., from the steam-generator; X', the damper in chimney to control draft, &c. Y is the ash-pit, with a bracket, Y', to support the pump Q. Wheels are attached to the apparatus, rendering it portable, and thus securing its use wherever desired.

When it is desired to heat oleaginous or other liquids in the chamber E by hot water passing through the coil F in lieu of steam, connections Z Z' with the water-chamber of the steam-generator, forming inlet and outlet ends of the coil F, are employed. When a larger proportion of heating-surface is required than can be given by the single coil of pipe, as shown in Figs. 1 and 4, I use a series of spirally-coiled pipes, and arrange them as shown in Figs. 5 and 6, wherein the series of spiral pipes are connected with and are common to the circular pipes F'' and F''', the steam from the steam-generator entering at F, thence circulating through the spiral pipes, and escaping to the condenser G, or to the steam-cylinder of the pump Q, in the manner hereinbefore described.

The mode of operating the apparatus is as follows, to wit: Fire is kindled in the fire-box A of the steam-generator, and, as steam is generated, (say, fifty to one hundred pounds to the square inch,) it flows into pipe M and through coil or scroll F, in chamber E, thereby heating the petroleum or other hydrocarbon or liquids, and converting them into gas or vapor, which passes off through pipes L and N to the point or place of combustion or condensation.

Steam is either first admitted into the chamber E through the pipe L, and there mixed with gas, when desirable, or steam and gas are run together through pipes M and L to pipe N, thence to foraminous pipe O, or other place of combustion.

By mixing the vapors, it has been long and well known that an increase of heat and corresponding saving of carbon are insured.

Water and oil are placed in suitable vessels and pumped therefrom by the steam-pump Q into their respective generators through pipes S' and T' alternately, as required.

The quantity of water, oil, &c., is indicated as above described by the test-cocks J J' J'' and gage-glass K. The pressure-gages W and W' indicate the pressure of the gas and steam in their respective generators. The safety-valves V and V' are arranged so as to relieve said generators when the pressure exceeds the amount that the valves are weighted to bear. All of the valves and cocks are so arranged as to be in sight and under the control of the operator, so that the utmost safety and economy may be secured.

The word "hydrocarbon" stands descriptive of the material from which gas or vapor is produced in the generator, and is intended to include all carbonaceous material, which may be used in a liquid form in said generator.

I do not claim the mere act of generating gas from petroleum or other hydrocarbons, but the mechanism by which the result is obtained. No part of my gas-generator is in immediate or near contact with the fire; consequently no evil result from carbonizing, either in the generator or pipes, can take place.

Having thus described the construction and operation of my invention, I claim and desire to secure by Letters Patent—

1. A steam-generator, having its heating capacity increased by exterior coiled tubing F, which extends below the surface of the hydrocarbon or other liquid in the surrounding gas-generator, in combination with said gas-generator E, substantially as and for the purpose specified.

2. The coiled tubing F, through which a circulation is induced by attachment to the steam-pipe of the pump Q or condenser G, combined with a central steam-generator, and an inclosing gas-generator or still, E, substantially as specified.

3. In combination with a steam-generator and a gas-generator, the pipes L N N', burner N'', foraminous pipe O, and cocks L' M', substantially as herein specified.

4. In combination with the gas-generator E, the internal steam-generator C, having a conical steam space, substantially as and for the purposes specified.

5. A steam-generator, having a furnace, heating-tubes, and chimney or pipe for the escape of the products of combustion, combined with a surrounding gas-generator, substantially as herein specified.

6. The condenser G, gas-generator E, and coiled tubing F, combined in a machine for the manufacture of gas from hydrocarbons, substantially as specified.

7. The condenser G, steam-pump Q, coiled tubing F, and gas-generator E, combined substantially as and for the purpose described.

8. In combination with a steam-generator and a gas-generator, the feed-pump Q, condenser G, two-way cocks, R and R', pipes S S' and T T', substantially as herein described.

9. In combination with a steam-generator, and a gas-generator, the residuum-cock U and steam-connection between the generators, whereby the gas-generator may be cleaned by steam-pressure, as specified.

BENJAMIN WALLIS.

Witnesses:
    TH. HARRIS HODGES,
    SAML. M. REID.